May 2, 1933. O. V. MARTIN 1,907,076
HYGROSCOPIC SALTS AND THEIR PREPARATION
Filed Aug. 28, 1930
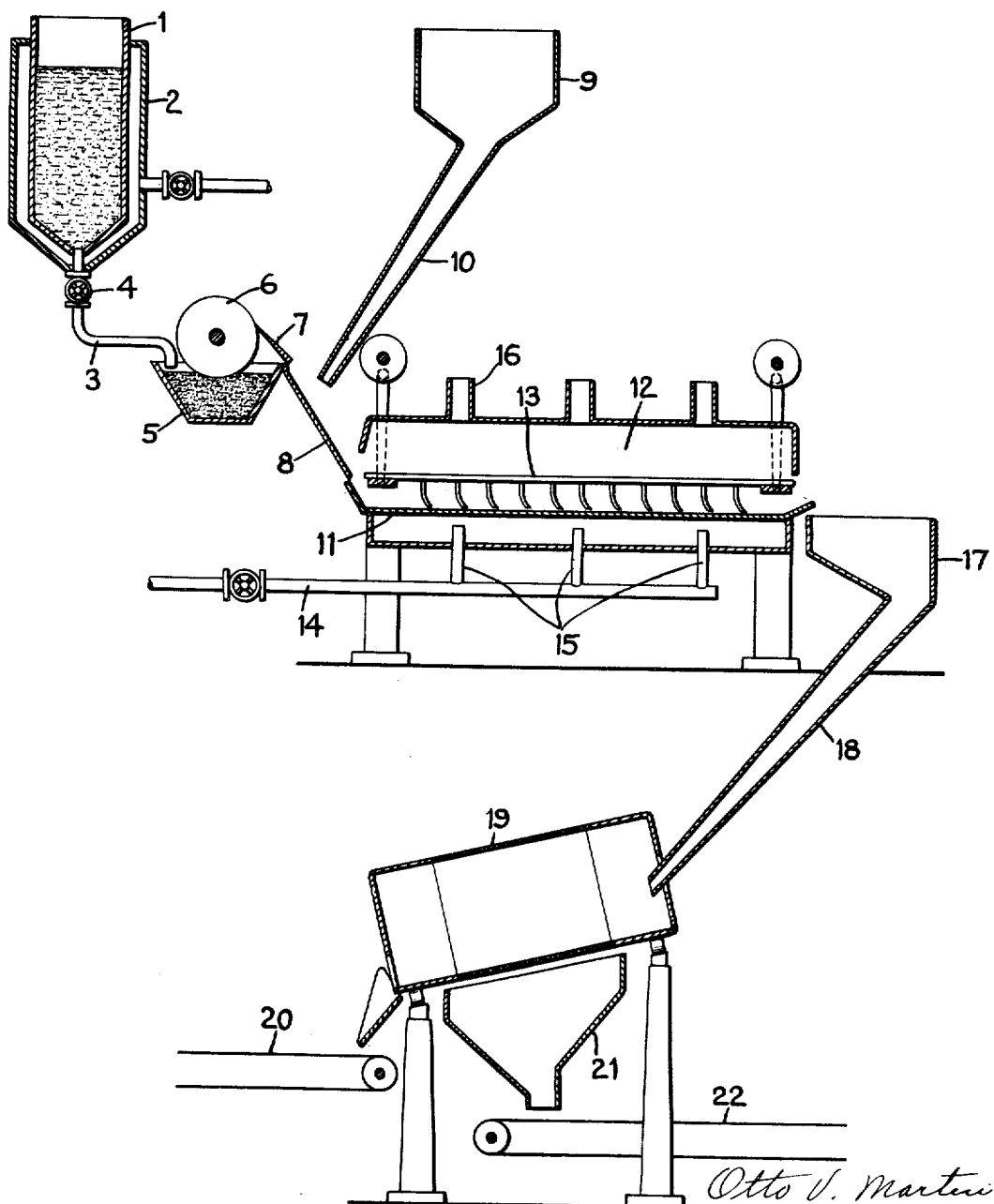
Otto V. Martin
INVENTOR
BY ATTORNEY
R. J. Dearborn Patented May 2, 1933

1,907,076

UNITED STATES PATENT OFFICE

OTTO V. MARTIN, OF SAND SPRINGS, OKLAHOMA, ASSIGNOR TO TEXACO SALT PRODUCTS COMPANY, OF NEW YORK, N. Y., A CORPORATION OF DELAWARE

HYGROSCOPIC SALTS AND THEIR PREPARATION

Application filed August 28, 1930. Serial No. 478,478.

This invention relates to hygroscopic salts and their preparation in non-caking comminuted form.

The invention broadly contemplates the preparation of salts, particularly metallic chloride and the like, which are hygroscopic in character, in comminuted form, comprising treated particles of salt which will not coalesce or cake together.

Certain chemical salt products, particularly the metallic chlorides, such as calcium and magnesium chloride, are extremely hygroscopic and possess a very great affinity for water. These products, which are usually produced in pulverulent or flake-like form, absorb moisture very rapidly from the surrounding atmosphere, resulting in a semifluid condition at the surface of the particles whereby they tend to coalesce or cake even when stored in containers relatively free from air or moisture, ultimately forming a substantially homogeneous solid mass.

The tendency of the particles or lumps to coalesce in containers is objectionable, since it renders the handling of the material very difficult during employment in its various fields of use, as for example, in its application as a binding medium in road construction.

Heretofore it has been attempted to overcome these objectionable features by superficially drying the surface of the particles by exposing them to a heating medium or by commingling the pulverulent material with a suitable proportion of the anhydrous form of the material in a very finely divided state. This finely divided material may comprise dust or sweepings collected from previous handling or treatment during the preparation of the salt.

Superficial drying of the particle surfaces is unsatisfactory due to difficulty in controlling the extent of the drying and in producing uniformly dried particles. On the other hand coating the particles with a powder consisting of the salt in anhydrous form is objectionable since it necessitates preparing and accumulating a considerable quantity of the anhydrous salt in the form of fine dust from material which was previously in the hydrated form.

My invention contemplates preparing salt having a hygroscopic character, as for example calcium chloride, in a desired comminuted stated from an acqueous solution of the salt and treating the resulting particles with a finely divided non-hygroscopic material to form a superficial and non-impervious coating for the particles and thereby produce a product which will retain its state of comminution. This protective coating serves to minimize the absorption of moisture at the surface of the particles from the surrounding atmosphere, as well as to prevent such intimate contact between the hygroscopic portions of the surfaces of adjacent particles in a container that they might otherwise coalesce to form a solid cake-like mass.

One aspect of my invention contemplates treating the surfaces of the particles of the salt with a material, preferably lime or an oxide of the metals of the alkaline earth group, such as magnesium oxide or calcium oxide, which chemically combines with a portion of the water of crystallization, or of the water otherwise associated with the salt, at the outer surface of the particles to thereby form a superficial protective covering consisting substantially of the hydroxide of the treating agent, which is non-hygroscopic in itself and which due to its slight penetration of the outer film of the particle may form a very tenacious but incompletely impervious coating adapted to prevent the particles from caking together.

A still further aspect of my invention contemplates coating the hygroscopic salt particles or flakes with a finely divided material derived from a substance which is non-hygroscopic in character, as for example, the carbonates of the metals of the alkaline earth group such as magnesium or calcium carbonate, or with some other somewhat similar substance to form a superficial coating adhering to the particles and which may extend in the form of small patches more or less completely over the exposed surfaces of the particles.

I have found that calcium chloride prepared in accordance with my invention and consisting of particles of the salt treated with magnesium oxide is particularly well adapted for use as a brine in refrigerator circulatory systems. Magnesium hydroxide resulting from the reaction between the magnesium oxide and the water at the surface of the particles is extremely effective in inhibiting the usual corrosive tendencies exerted by the chloride towards the metal vessels and pipes of such circulatory systems since it serves to maintain the brine in a neutral or slightly basic condition during continued use. The amount of magnesium hydroxide required for treating the surfaces of the particles preferably does not exceed 0.25 percent by weight of the final product and may amount to only about 0.14 percent by weight of the final product in order to render the particles of salt non-coalescent or non-cohesive, as well as inhibit the corrosive tendencies of the salt towards iron and steel when in the form of aqueous solutions.

Moreover, brine prepared from my product is particularly suited for refrigerating purposes in the packing industries due to its remaining in a neutral or slightly basic condition, and therefore non-productive of odorous gases which may frequently be evolved from ordinary brines when they become slightly sour or acidic during continued use, and which gases readily permeate and are absorbed by meats or other products which are being maintained under refrigerating conditions.

For example, a product suitable for a refrigerating brine may comprise flakes of calcium chloride treated with magnesium oxide in an amount not exceeding about 0.25% by weight of the final product. Such a product is adapted to produce an aqueous brine which is non-corrosive to iron and steel.

My invention therefore comprises the preparation of a hygroscopic salt, particularly calcium chloride and the like in a comminuted state, consisting of particles whose surfaces have been either treated with an oxide of the alkaline earth metals which reacts with a portion of the water of crystallization, or of the water associated with the salt at the outer surface of the particles, to form a partial covering consisting substantially of the hydroxide of the treating agent, or coated with a non-hygroscopic material, such as a carbonate of the alkaline earth metals, which adheres to the surfaces of the particles by mechanical or physical means, to form a superficial covering for the particles adapted to prevent them from coalescing or caking together.

The accompanying drawing, to which reference will now be made, diagrammatically illustrates the method of carrying out my invention.

The salt solution from which the desired treated solid salt particles are to be obtained, and which in the case of a calcium chloride solution may comprise roughly forty percent of anhydrous salt, may be charged to a kettle 1, having a steam heating jacket 2, wherein the solution is concentrated to form a molten mass of salt which may comprise from seventy-five to eighty percent of anhydrous material.

The molten salt may then be conducted through a pipe 3, having a valve 4, to a pan 5 into which the surface of a cooling roll 6 dips. The molten salt adheres to the roll, solidifying thereon as the roll revolves, until it is removed in pulverulent or flake-like form by a blade 7 and discharged on to a chute 8. The roll may be cooled by water flowing through its interior.

The particles or flakes, together with a predetermined quantity of the coating material, which latter may be conducted from a storage hopper 9 by a chute 10 to the chute 8, are delivered on to one end of the mixing pan 11, extending longitudinally through a chamber 12. A rake 13, movably supported over the pan 11, is adapted to subjecting the particle mass to stirring and mixing while moving over the pan 11 to thereby intermingle the hygroscopic salt particles with the coating material.

Unsaturated air or warm gas may be conducted from a suitable source (not shown) through a conduit 14 and introduced to the chamber 12 through a plurality of branch pipes 15 to flow around the pan 11 and over the particle mass thereon, following which it may be discharged to the atmosphere through a plurality of outlet pipes 16. In this way an atmosphere may be maintained within the chamber 12 containing no available moisture which might be absorbed by the hygroscopic salt particles and result in their coalescence prior to or during the application of the coating material to their surfaces.

The intermingled admixture of coated or treated salt particles and excess coating material leaving the discharge end of the pan 11 are delivered to a hopper 17 from which they are delivered through a chute 18 to an inclined rotary screen 19 adapted to separate the excess coating material from the coated particles. The coated particles of salt pass over the rotating screen 19 onto a conveyor 20 for delivery to storage, while the excess coating material in a state of relatively finer division than the coated particles passes through the rotary screen into a hopper 21, from which it may be returned on a conveyor 22 to the hopper 9, previously mentioned, for recycling through the pan 11.

While I have found the foregoing apparatus well adapted to the preparation of calcium chloride, magnesium chloride and other salts having a hygroscopic character in pulverulent form, comprising particles which will not cake or coalesce in packages or containers, it is contemplated that other forms of apparatus or other means of carrying out various steps of the invention may also be satisfactorily employed. In the appended claims, reference to a metallic oxide of the alkaline earth group is intended to include magnesium oxide.

Obviously many modifications and variations of the invention, as hereinbefore set forth, may be made without departing from the spirit and scope thereof, and therefore only such limitations should be imposed as are indicated in the appended claims.

I claim:

1. As a new product, comminuted calcium chloride hydrate comprising particles whose surfaces have been treated with magnesium oxide to chemically combine with water of hydration at the surface of the particles and form a non-hygroscopic coating composed substantially of magnesium hydroxide to render the particles non-coalescent and adapted to retain their comminuted state.

2. As a new product, comminuted calcium chloride hydrate comprising particles whose surfaces have been treated with calcium oxide to chemically combine with water of hydration at the surface of the particles and form a non-hygroscopic coating composed substantially of calcium hydroxide to render the particles non-coalescent and adapted to retain their comminuted state.

3. As a new product, calcium chloride hydrate adapted for making up non-corrosive brine solutions for refrigerator circulatory systems comprising particles of the salt treated with magnesium oxide to form a coating composed substantially of magnesium hydroxide to prevent caking together and adapted to produce an aqueous brine solution which is non-corrosive to iron and steel.

4. As a new product, calcium chloride hydrate adapted for making up non-corrosive brine solutions for refrigerator circulatory systems comprising particles of calcium chloride treated with about 0.25% by weight of magnesium oxide to form a coating composed substantially of magnesium hydroxide to prevent caking together, and adapted to produce an aqueous brine which is non-corrosive to iron and steel.

5. In the preparation of comminuted calcium chloride hydrate the step which comprises treating the surfaces of the particles during exposure to drying gas with a metallic oxide of the alkaline earth group to chemically combine with water at the surface of the particles and form a coating consisting substantially of the hydroxide of the treating material adapted to prevent caking together of the particles.

6. In the preparation of comminuted calcium chloride hydrate the step which comprises treating the surfaces of the particles during exposure to drying gas with magnesium oxide to chemically combine with water at the surface of the particles and form a coating composed substantially of magnesium hydroxide adapted to prevent caking together of the particles.

In witness whereof I have hereunto set my hand this 21 day of August, 1930.

OTTO V. MARTIN.